United States Patent [19]

Tribolet et al.

[11] Patent Number: 4,573,129

[45] Date of Patent: Feb. 25, 1986

[54] AUTOMATIC PEN-SENSOR

[75] Inventors: David C. Tribolet; David L. Paulsen, both of San Diego, Calif.

[73] Assignee: Hewlett-Packard Company, Palo Alto, Calif.

[21] Appl. No.: 645,512

[22] Filed: Aug. 27, 1984

Related U.S. Application Data

[63] Continuation of Ser. No. 606,552, May 4, 1984, abandoned, which is a continuation of Ser. No. 352,405, Feb. 25, 1982, abandoned.

[51] Int. Cl.⁴ .......... G06K 15/40

[52] U.S. Cl. .......... 364/520; 346/33 MC; 346/52; 346/139 R

[58] Field of Search .......... 364/520; 318/578, 626; 346/33 MC, 46, 52, 139 R, 141; 33/1 M, 18 R; 29/568

[56] References Cited

U.S. PATENT DOCUMENTS

| | | | |
|---|---|---|---|
| 4,001,556 | 1/1977 | Folchi et al. | 364/513 |
| 4,135,245 | 1/1979 | Kemplin et al. | 346/29 |
| 4,228,595 | 10/1980 | Steinbach | 33/1 M |
| 4,288,798 | 9/1981 | Hollmayer | 346/139 R |
| 4,334,124 | 6/1982 | Imsand et al. | 364/520 |
| 4,357,664 | 11/1982 | Imazeki et al. | 364/520 |
| 4,393,448 | 7/1983 | Dunn et al. | 364/520 |
| 4,401,996 | 8/1983 | Shirahata | 364/520 |
| 4,417,258 | 11/1983 | Tribolet et al. | 364/139 R |

*Primary Examiner*—Jerry Smith
*Assistant Examiner*—John R. Lastova
*Attorney, Agent, or Firm*—Douglas Kundrat; Joseph H. Smith

[57] ABSTRACT

A bi-directional pen plotter includes two pen stables and a pen holder located between the two pen stables for snatching a pen from either pen stable and for inserting a pen into either pen stable. There are four distinct stops to the motion of the pen holder at each pen stable depending on the four possible combinations of pen locations. Measuring the relative distances travelled by the pen holder in an initialization procedure the positions of all of the pens in the system may be determined uniquely.

11 Claims, 20 Drawing Figures

FIGURE 14

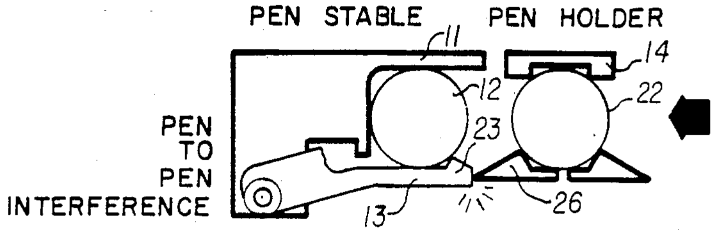

FIGURE 15

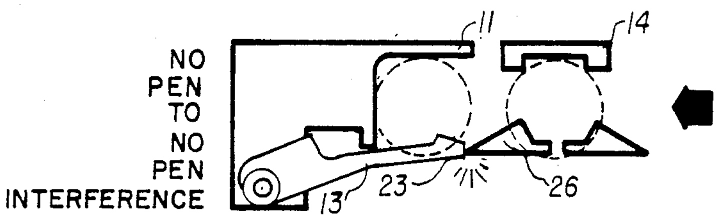

FIGURE 16

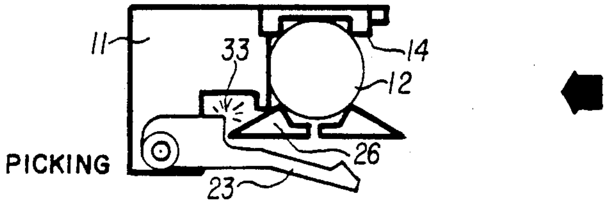

FIGURE 17

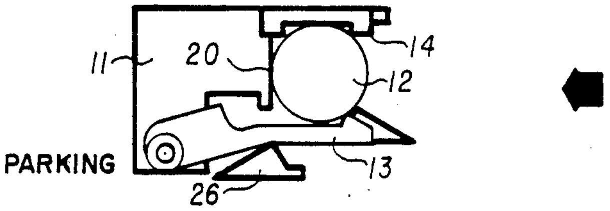

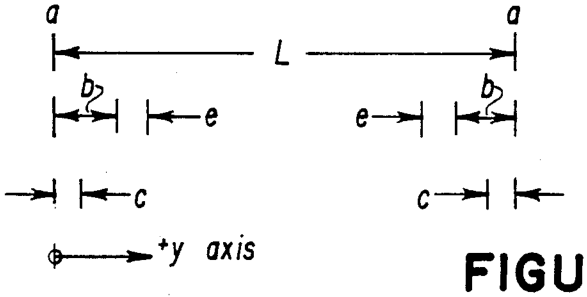

LEGEND: STOPS AT "a" ARE A DISTANCE "L" APART. STOPS AT DISTANCE "b" CORRESPOND TO NO PEN IN EITHER PEN HOLDER OR PEN STABLE. STOPS AT DISTANCE "b+e" CORRESPOND TO A PEN IN BOTH PEN HOLDER AND PEN STABLE. STOPS AT DISTANCE "c" CORRESPOND TO A PEN SNATCH.

FIGURE 18

| CONFIGURATION | LEFT STABLE CONDITION | PEN HOLDER CONDITION | RIGHT STABLE CONDITION |
|---|---|---|---|
| I | ● * | ● | ○ |
| II | ○ ** | ● | ● |
| III | ● | ○ | ● |
| IV | ● | ● | ● |
| V | ○ | ○ | ○ |
| VI | ● | ○ | ○ |
| VII | ○ | ● | ○ |
| VIII | ○ | ○ | ● |

* ● PEN POSITION FULL
** ○ PEN POSITION EMPTY

FIGURE 19

AUTOMATIC PEN-SENSOR

This is a continuation of application Ser. No. 606,552, filed May 4, 1984, now abandoned, which was a continuation of application Ser. No. 352,405, filed Feb. 25, 1982, now abandoned.

BACKGROUND OF THE INVENTION

In recent years, with the development of micro- and minicomputers, the expense of computer peripherals has often outweighed the expense of the associated computer itself. This has been especially true of electronic drafting devices and, as a result, efforts have been made to reduce costs by reducing the number of electromechanical parts required in the drafting device and by relying on as many passive elements as possible. This philosophy has been particularly predominant in the development of pen-holding and pen-changing devices but has not seen concerted application in the area of pen-sensing devices.

In multi-pen plotters it is important for the plotter to sense the location of all of the pens in the device in order to avoid trying to select a pen which does not exist, to avoid writing without a pen, and to eliminate pen-to-pen collisions. Prior art solutions to the pen sensing problem have use mechanical switches or optical detectors. In the case of mechanical switches, each sensor requires a switch, adjustment and considerable and the switches themselves are prone to reliability problems. Optical sensors, too, require considerable assembly time and adjustment and the cost of photodetectors is not insignificant. Additionally, paper dust and other foreign particles are known to build up on the surfaces of the photodetectors thereby causing interference with their operation. Both of these prior art solutions to the sensing problem are known to be expensive to implement.

SUMMARY OF THE INVENTION

In accordance with an illustrated preferred embodiment of the present invention, a bi-directional pen changer mechanism does not require the use of mechanical switches or optical detectors to determine pen locations. The device is made up of two pen stables, one on each side of a pen carriage bar, and a pen holder located between the two pen stables which holds a pen during plotting. The pen holder is mounted on the pen carriage bar and is symmetrically configured with two independent clamp arms, one for engaging each pen stable. Each pen stable has a fixed body and a single clamp arm for holding a pen firmly against the fixed body.

In order to snatch a pen from a pen stable, the empty pen holder is moved into contact with the stable thereby causing the pen holder clamp arm to engage the pen stable clamp arm and to push it aside as the pen holder clamp arm takes control of the pen. The pen holder is moved clear of the pen stable and standard plotting routines may then be followed. Upon completion of the plotting routines, the pen holder re-inserts the pen in the pen stable by reversing the above procedure. In this reverse procedure, however, the pen holder clamp arm is moved aside by the pen stable clamp arm which then clasps the pen. The pen holder is then moved clear of the pen stable. The symmetry of the pen holder makes it possible to snatch or re-insert a pen from either side. Also, the pen holder clamp arms are configured such that the pen tip is always at the same location relative to the clamp arms when the pen holder is holding a pen regardless of the side from which the pen is snatched.

Information as to pen locations is provided through an initialization scheme before plotting routines are begun. In the illustrated preferred embodiment of the present invention the pen holder and pen stables are configured to coact in a manner such that four separate and distinct contact stops are provided. The four stops correspond to the four possible configurations available on each side; i.e., initially having (1) a pen in both the pen holder and the pen stable; (2) no pen in either the pen holder or pen stable; (3) a pen in the pen stable but no pen in the pen holder; and (4) a pen in the pen holder but no pen in the pen stable. These four stops correspond directly to stall points of a D.C. motor used to drive the pen holder.

On initial start up, the pen holder is moved first to a pen stable on one side of the pen carriage bar until it hits a stop and the D.C. motor stalls. The pen holder is then backed off and moved into contact again with the same pen stable until the D.C. motor stalls a second time. The pen holder is then moved to the opposite end of the pen carriage bar until the D.C. motor stalls, thereby indicating the position of a first stall point at the other pen stable. The pen holder is then backed off and moved into contact again with this other pen stable, thereby indicating the relative position of a second stall point. The relative positions of the four stall points obtained through this initialization procedure, together with an appropriate algorithm, is sufficient to uniquely determine the initial location of all pens in the system.

BRIEF DESCRIPTION OF THE DRAWINGS

FIGS. 14–17 show detailed views of a pen detection sequence performed by the preferred embodiment of the present invention.

FIG. 19 depicts various possible pen locations encountered by the preferred embodiment of the present invention.

DETAILED DESCRIPTION OF THE PREFERRED EMBODIMENT

Figure 1:
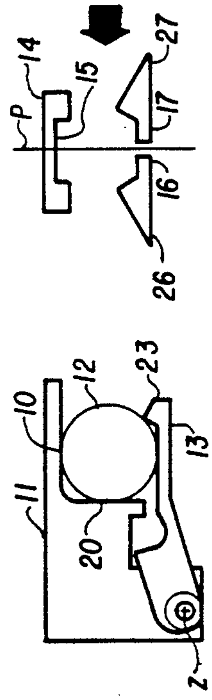
FIGS. 1–8 depict various stages in the operation of the preferred embodiment of the present invention.

FIGS. 1 through 8 show a top view of a preferred embodiment of the invention from a pen snatch operation through a pen re-insertion operation. FIG. 1 shows a pen stable 11 having a concave portion, formed by a side 10 and a side 20, for cradling a pen 12 in a well defined position. Also shown is a single clamp arm 13, hinged about a vertical axis Z on pen stable 11, having a clamp arm end 23 in the shape of a truncated barb. Clamp arm 13 is typically equipped with a rubber band or spring (not shown) for holding clamp arm 13 firmly in contact with pen 12 in order that pen 12 may be held in place in the concave portion of the pen stable 11 formed by sides 10 and 20. Also shown in FIG. 1 is a pen holder 14 for snatching pen 12 from pen stable 11 and for holding pen 12 during plotting. Pen holder 14 is symmetrical in a plane P, perpendicular to the direction of motion of pen holder 14, and is equipped with two clamp arms 16 and 17 located opposite each other (i.e., on opposite sides of plane P) so that a pen may be snatched from either side. Clamp arms 16 and 17 have barb-shaped ends 26 and 27, respectively.

Figure 2:
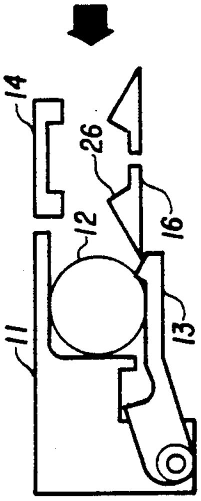
Figure 3:
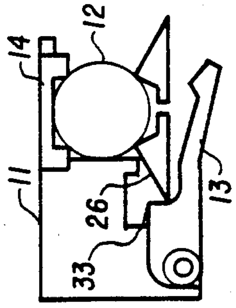
Figure 4:
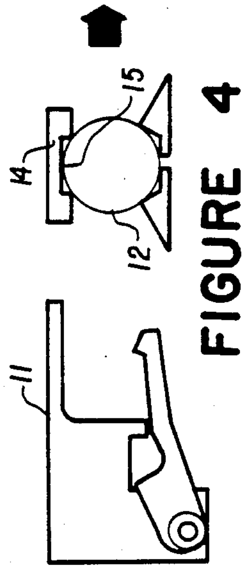
Figure 5:
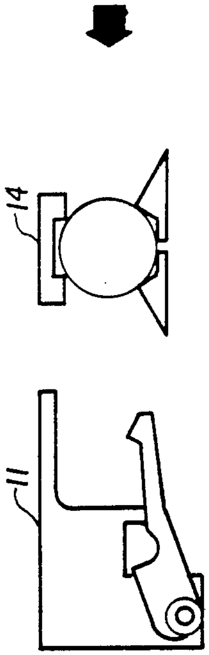
Figure 6:
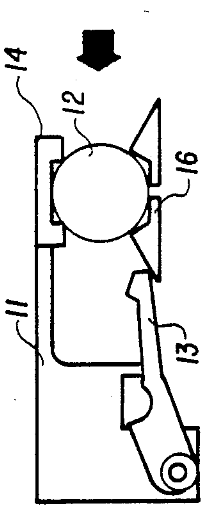
Figure 7:
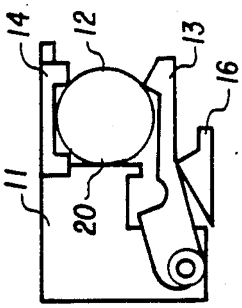

In FIG. 2, as pen holder 14 is moved toward pen stable 11 the barb-shaped end 26 of clamp arm 16 moves clamp arm 13 aside and pen 12 is snatched from the stable 11. A rubber band or spring (not shown) is typically used to provide a restoring force on clamp arm 16 to maintain clamp arm 16 near the home position illustrated in FIG. 1. FIG. 3 shows the full depth of penetration of pen holder 14 as barb-shaped end 26 hits a stop 33 located on clamp arm 13. FIG. 4 shows the nominal position of pen 12, centered in a concave portion 15 of pen holder 14, after the snatch.

Figure 8:
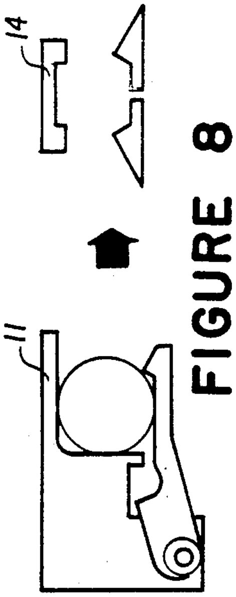

FIGS. 5 through 8 show the process of re-insertion of pen 12 into pen stable 11. In this process pen holder 14 is again moved toward pen stable 11. Clamp arm 13 is configured to have a nominal position, when not holding a pen, such that clamp arm 13 is able to move inside clamp arm 16 and to force it to one side as pen holder 14 closes with pen stable 11 (see FIG. 6). Pen holder 14 continues to close with pen stable 11 until pen 12 hits side 20 of the concave position of pen stable 11, thus providing a well defined stop to the motion of pen holder 14 (see FIG. 7). Once inside of clamp arm 16, clamp arm 13 takes control of pen 12 and pen holder 14 moves clear of pen stable 11 as shown in FIG. 8.

Figure 9:
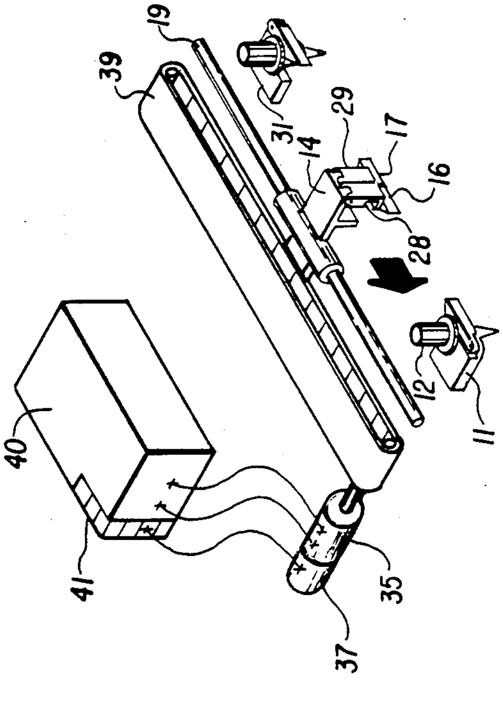
FIGS. 9–13 show in perspective various of the stages of operation shown in FIGS. 1–8.
Figure 10:
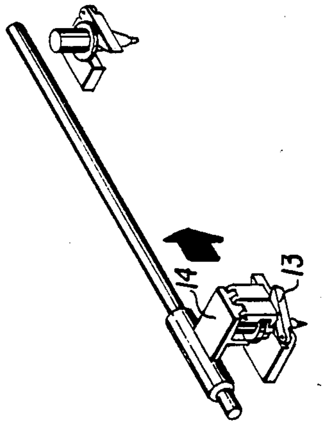

FIGS. 9 through 13 show an oblique view of the same process. In FIG. 9, pen holder 14 is shown mounted on a carriage bar 19 and moving towards pen stable 11. Movement typically may be provided by a belt 39 being driven by a pen axis motor 35 having an optical shaft encoder 37. Clamp arms 16 and 17 are hinged about a horizontal axis via extension arms 28 and 29, respectively. As illustrated in FIG. 10, clamp arm 13 is moved aside as pen holder 14 snatches the pen and moves away.

Figure 11:
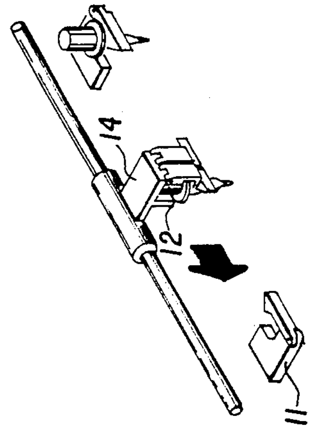
Figure 12:
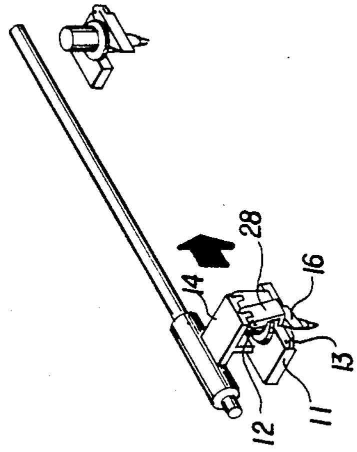
Figure 13:
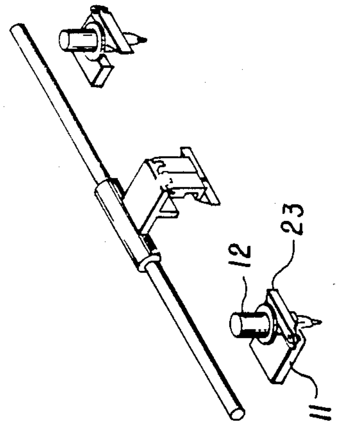

In the reverse procedure shown in FIGS. 11 through 13, pen 12 is re-inserted into pen stable 11. As pen holder 14 approaches pen stable 11, clamp arm 13 pushes clamp arm 16 aside causing extension arm 28 to rotate about its hinge. Clamp arm 13 then clasps pen 12 thereby holding pen 12 in firm contact with pen stable 11. The symmetry of pen holder 14 permits the snatch and re-insertion procedures to be performed from either side. A second pen stable 31 and pen 22, opposite pen stable 11, is typically provided so that a two-pen system is available as illustrated in FIGS. 9 through 13.

In order to eliminate the requirement for switches or optical detectors to locate pen positions, an initialization scheme is used to locate all pens that may be in the system before any plotting routines are begun. As illustrated in FIGS. 14 through 18, this scheme relies on the geometry and interactions of the two pen stables 11, 31, with pen holder 14. The pen holder 14 is configured to coact with each pen stable in a manner such that four separate and distinct stops corresponding to stall points of D.C. motor 35 are provided. The stop closest to the center of pen carriage 19 occurs when both pen stable 11 and pen holder 14 contain a pen. This occurrence is illustrated in FIG. 14 in which the barb-shaped end 26 is shown colliding with the truncated portion of clamp arm end 23. Similarly, the stop which is next closest to the center of pen carriage bar 19 occurs when neither pen stable 11 nor pen holder 14 contains a pen, as illustrated in FIG. 15. This stop is further from the center of pen carriage bar 19 than the stop shown in FIG. 14 due to the fact that clamp arm 13 describes an arc about an axis of rotation which is not in alignment with barb-shaped end 26. Hence, pen holder 14 travels further before clamp arm 23 and barb-shaped end 26 collide. Although this difference in distance is typically small (e.g., 1 mm.), optical shaft encoder 37 is typically chosen to have a resolution of approximately 0.025 mm or better in order to meet plotting demands. Hence, resolution is usually not a problem in distinguishing these two stops. The stop shown in FIG. 16 is located even further from the center of pen carriage bar 19 and corresponds to the situation shown in FIG. 3, in which a pen is present in pen stable 11 and no pen is present in pen holder 14. As described earlier, the stop occurs as barb-shaped end 26 collides with stop 33 of clamp arm 13. The stop furthermost from the center of pen carriage bar 19 is shown in FIG. 17. This furthermost stop is reached if a pen is present initially in pen holder 14 and no pen is present initially in pen stable 11 as described earlier in the discussion of FIG. 7. The relative positions of these stops for both the left and right sides are shown diagramatically in FIG. 18. The various possible pen configurations are shown in FIG. 19.

Figure 20:
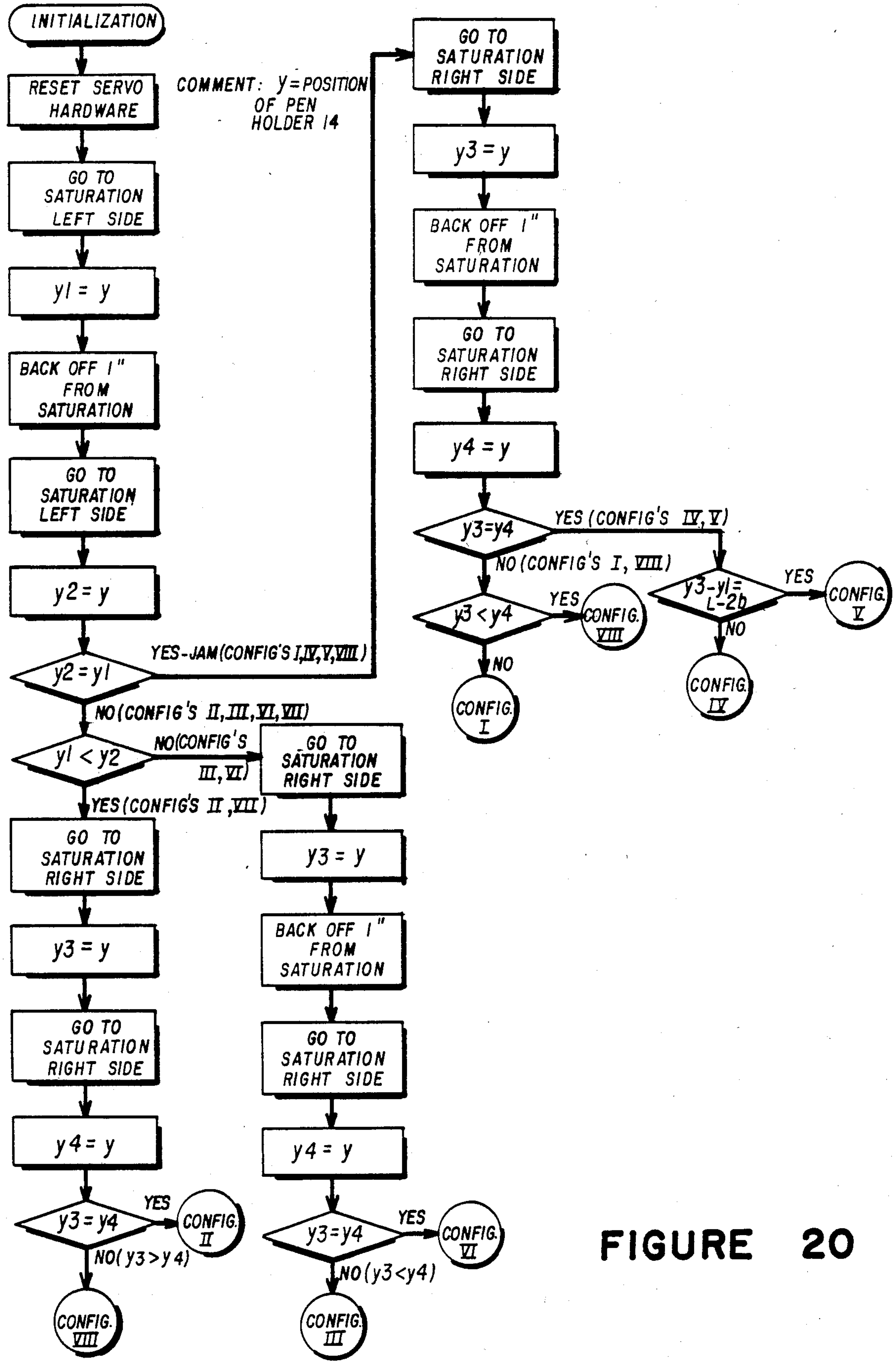
FIG. 20 is a flow chart of the preferred embodiment of the present invention.

An initialization scheme may be used to initially locate all pens used in the system in accordance with the sequence of FIGS. 9 through 13. Control system 40, which may be implemented as a microprocessor, typically has no information as to initial pen locations or the location of pen holder 14. As shown in the flow chart designated as FIG. 20, the pen holder 14 is first moved to the left pen stable 11 until saturation occurs, i.e., until the pen holder 14 hits a stop and D.C. motor 35. An initial position, Y1, for pen holder 14 is thus established and measured by optical shaft encoder 37. The pen holder 14 is then backed off and moved into contact again with pen stable 14 and the new stall position is recorded by control system 40 as Y2. Pen holder 14 is then moved to saturation on the right side at pen stable 31 and a new stall position Y3 is recorded by control system 40. The pen holder 14 is then backed off and moved into contact again with pen stable 31 until saturation occurs and a new stall point Y4 is determined. As can be seen from FIG. 20, determination of the relative positions of Y1, Y2, Y3 and Y4 is sufficient for control system 40 to uniquely determine the initial pen configuration. Plotter control system 40 includes a ROM 41, as illustrated in FIG. 9, for implementing various plotting routines. With minor firmware changes to the ROM 41, the simple logic depicted in FIG. 20 may be implemented to provide the initialization scheme discussed hereinabove.

The configuration of the various clamp arms may vary widely and still provide four separate stops and many distance measuring systems are available other than the optical shaft encoder discussed above. Also instead of using only the relative positions of Y3 and Y4 at pen stable 31, the actual distances to these right stall points from Y1 and Y2 may yield information directly as to the presence or non-presence of a pen in the right pen stable 31. Furthermore, the invention may be used in a system having pens on only one side of the pen holder as in a pen magazine arrangement.

We claim:

1. An apparatus for sensing presence of one or more pens in a plotter, comprising:

stable means for holding a stable pen, including a back plate, an orthogonal side plate connected thereto and a stable arm connected to the side plate, the stable arm being arcuately movable in an X-Y plane for holding the stable pen against the back and side plates, the stable arm being positioned at an empty position during non-presence of the stable pen and at a full position during presence of the stable pen;

the empty position being located at first X- and Y-coordinates on orthogonal X- and Y-axes of the X-Y plane;

the full position being located at second X- and Y-coordinates;

holder means for holding a plotting pen, the holder means being X-axis movable and including a Y-axis movable holder arm for holding the plotting pen against a holder plate, the holder arm being positionable at the first Y-coordinate during non-presence of the plotting pen and at the second Y-coordinate during presence of the plotting pen;

drive means, coupled to the holder means, for causing X-axis motion of the holder means and for urging the holder means into contact with the stable means;

measuring means, coupled to the holder means, for measuring a stall X-coordinate of the holder means when the holder means is in contact with the stable means; and logic means, coupled to the measuring means, for determining presence or non-presence of the stable and plotting pens from the stall X-coordinate.

2. An apparatus as in claim 1, wherein:

the stall X-coordinate is the X-coordinate at which the stable arm contacts the holder arm; and the logic means is operative for determining that both the stable and plotting pens are not present if the stall X-coordinate is substantially equal to the first X-coordinate.

3. An apparatus as in claim 2, wherein the logic means is operative for determining that both the stable and plotting pens are present if the stall X-coordinate is substantially equal to the second X-coordinate.

4. An apparatus as in claim 3, wherein the first X-coordinate is located between the side plate and the second X-coordinate.

5. An apparatus as in claim 4, wherein the first Y-coordinate is located between the back plate and the second Y-coordinate.

6. An apparatus as in claim 5, wherein:

the holder arm includes an inwardly disposed gripping surface for gripping and retaining the plotting pen;

the holder arm further includes an outwardly directed wedge for insertion between the stable pen and the stable arm;

the stable means includes a back stop positioned to contact the holder arm upon complete insertion of the wedge between the stable pen and the stable arm; and the holder arm, when positioned at the first Y-coordinate, is insertable between the stable pen and the stable arm such that the holder arm grips the stable pen and contacts the back stop at a third X-coordinate.

7. An apparatus as in claim 4, wherein the logic means is operative for determining that the stable pen is initially present and the plotting pen is initially not present if the stall X-coordinate is substantially equal to the third X-coordinate.

8. An apparatus as in claim 7, wherein:

the stable arm includes an inwardly disposed gripping surface for gripping and retaining the stable pen;

the stable arm further includes an outwardly directed wedge for insertion between the plotting pen and the holder arm; and the stable arm, when positioned at the first Y-coordinate, is insertable between the plotting pen and the holder arm such that the stable arm grips the plotting pen and the holder means travels beyond the first X-coordinate.

9. An apparatus as in claim 8, wherein the drive means comprises a motor.

10. An apparatus as in claim 9, wherein the measuring means comprises an encoder for measuring rotation of the motor.

11. An apparatus as in claim 10, wherein the logic means comprises a microprocessor.

* * * * *